United States Patent
Azhen et al.

(10) Patent No.: US 10,261,806 B2
(45) Date of Patent: Apr. 16, 2019

(54) ADAPTIVE HARDWARE CONFIGURATION FOR DATA ANALYTICS

(71) Applicant: International Business Machines Corporation, Armonk, NY (US)

(72) Inventors: J. I. Azhen, Beijing (CN); Yi Ge, Beijing (CN); Yong Hua Lin, Beijing (CN); Chao Xue, Beijing (CN); Rong Yan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 15/581,219

(22) Filed: Apr. 28, 2017

(65) Prior Publication Data

US 2018/0314533 A1 Nov. 1, 2018

(51) Int. Cl.
*G06F 15/173* (2006.01)
*G06F 9/445* (2018.01)
*G06N 99/00* (2019.01)
*G06F 9/4401* (2018.01)
*G06N 5/04* (2006.01)
*G06F 9/50* (2006.01)
(Continued)

(52) U.S. Cl.
CPC .......... *G06F 9/44505* (2013.01); *G06F 9/442* (2013.01); *G06F 9/5027* (2013.01); *G06N 5/04* (2013.01); *G06N 99/005* (2013.01); *H04L 41/0813* (2013.01); *H04L 41/145* (2013.01); *H04L 41/147* (2013.01); *H04L 41/16* (2013.01); *G06F 2209/501* (2013.01); *G06F 2209/508* (2013.01); *H04L 67/10* (2013.01)

(58) Field of Classification Search
CPC .............. H04L 43/0876; G06F 9/5083; G06F 11/3419; G06F 11/3466; G06F 11/3409; G06F 11/008
USPC ....................................................... 709/224
See application file for complete search history.

(56) References Cited

U.S. PATENT DOCUMENTS

| 7,669,204 B2 | 2/2010 | Moilanen et al. |
| 2004/0019885 A1* | 1/2004 | Mandava ............ G06F 11/3419 717/158 |

(Continued)

FOREIGN PATENT DOCUMENTS

| CN | 104102702 | 10/2014 |
| CN | 105550268 | 5/2016 |

OTHER PUBLICATIONS

Awan, A., et al., "Architectural Impact on Performance of In-Memory Data Analytics: Apache Spark Case Study", KTH Royal Institute of Technology, Software and Computer Systems Department, Technical University of Catalunya, Apr. 28, 2016, https://arxiv.org/pdf/1604.08484.pdf, pp. 1-14.

(Continued)

*Primary Examiner* — Kyung H Shin
(74) *Attorney, Agent, or Firm* — Fleit Gibbons Gutman Bongini Bianco PL; Jon A. Gibbons (57) ABSTRACT

A computer-implemented method uses a predictive time-sequence model to adapt hardware configurations at run-time for an application including multiple stages of execution. At each stage a system monitor is started at the launch of a first task in a first run to collect performance data. The system monitor is stopped at the completion of a last task in the first run, then a predictive optimal configuration is computed and applied to the remaining runs in the stage.

15 Claims, 8 Drawing Sheets

(51) Int. Cl.
*H04L 12/24* (2006.01)
*H04L 29/08* (2006.01)

(56) References Cited

U.S. PATENT DOCUMENTS

2011/0231582 A1* 9/2011 Uysal .................... G06F 11/008
 710/15
2014/0297833 A1* 10/2014 Bedini ................ H04L 43/0876
 709/224

OTHER PUBLICATIONS

Jia, Z., et al., "Auto-tuning Spark Big Data Workloads on POWER8: Prediction-Based Dynamic SMT Threading", Proceedings of the 25th International Conference on Parallel Architectures and Compilation Techniques, Sep. 11-15, 2016, pp. 1-14.

Kumar, S., "Bigdata Analytics with Spark", Proceedings of the International Conference on Information Engineering, Management and Security, Aug. 13-14, 2015, pp. 1-5.

Chaimov, N., et al., "Scaling Spark on HPC Systems", Proceedings of the 25th ACM International Symposium on High-Performance Parallel and Distributed Computing, May 31-Jun. 4, 2016, pp. 1-14.

* cited by examiner

Algorithm 2 Algorithm in *CoarseGrainedSchedulerBack-end*

Input: *Variables:*
  Current SMT configurations: *CurSMT*;
  Task state: *state*;
  Current Stage Id: *curStageId*;
  Last Stage Id: *lastStageId*;
  if isFinished(*state*) then
1. if *lastStageId* != *curStageId* then
2.   *lastStageId* = *curStageId*
3.   if monitorIsRuning() then
4.     PBDST.monitor.stop();
5.   predictSMT = PBDST.prediction(*CurSMT*);
6.   if predictSMT != *CurSMT* then
7.     for executor in executorMap do
8.       executor.freeCores.updating(predictSMT);
9.     end for
10.   end if
11. end if
12. end if
13. end if

*Fig. 8*

Algorithm 1 Algorithm in *DAGScheduler*

Input: *Variables:*
  Current SMT configurations: *CurSMT*;
  The number of cores: *cores*;
  The task information: *taskSets*;
1. if noStageIsRuning() then
2.   if *tasks.size* > *CurSMT* × *cores* then
3.     PBDST.monitor.start();
4.   end if
5. end if

ADAPTIVE HARDWARE CONFIGURATION FOR DATA ANALYTICS

BACKGROUND

The present disclosure generally relates to data analytics and more specifically relates to adapting hardware configurations in cluster computing to optimize data analytics applications.

The increase in smart phone use, social media applications, and search engines, to name a few, have contributed to an enormous explosion of data growth. The volume of data created worldwide grows exponentially every day. "Big Data" is a relatively new term describing enterprise-size data sets. Analyzing Big Data to distill meaningful information requires leading edge hardware and software. Superscalar multiprocessors such as POWER8® by International Business Machines Corporation (IBM®) feature 4, 6, 8, 10 and 12 core variants, with each core capable of simultaneously handling up to eight hardware threads. A notable feature of POWER8 is that it balances thread assignments.

At the hardware layer, architectural techniques such as Simultaneous Multithreading (SMT) and Prefetch are used to improve overall system performance. At the software layer, Apache Spark™ by the Apache Software Foundation is one of the most popular large-scale data analytics frameworks. However, Spark™ performance is affected by different SMT and Prefetch settings, so the challenge becomes "How to tune the hardware settings to optimize the Spark performance?"

Figure 1:
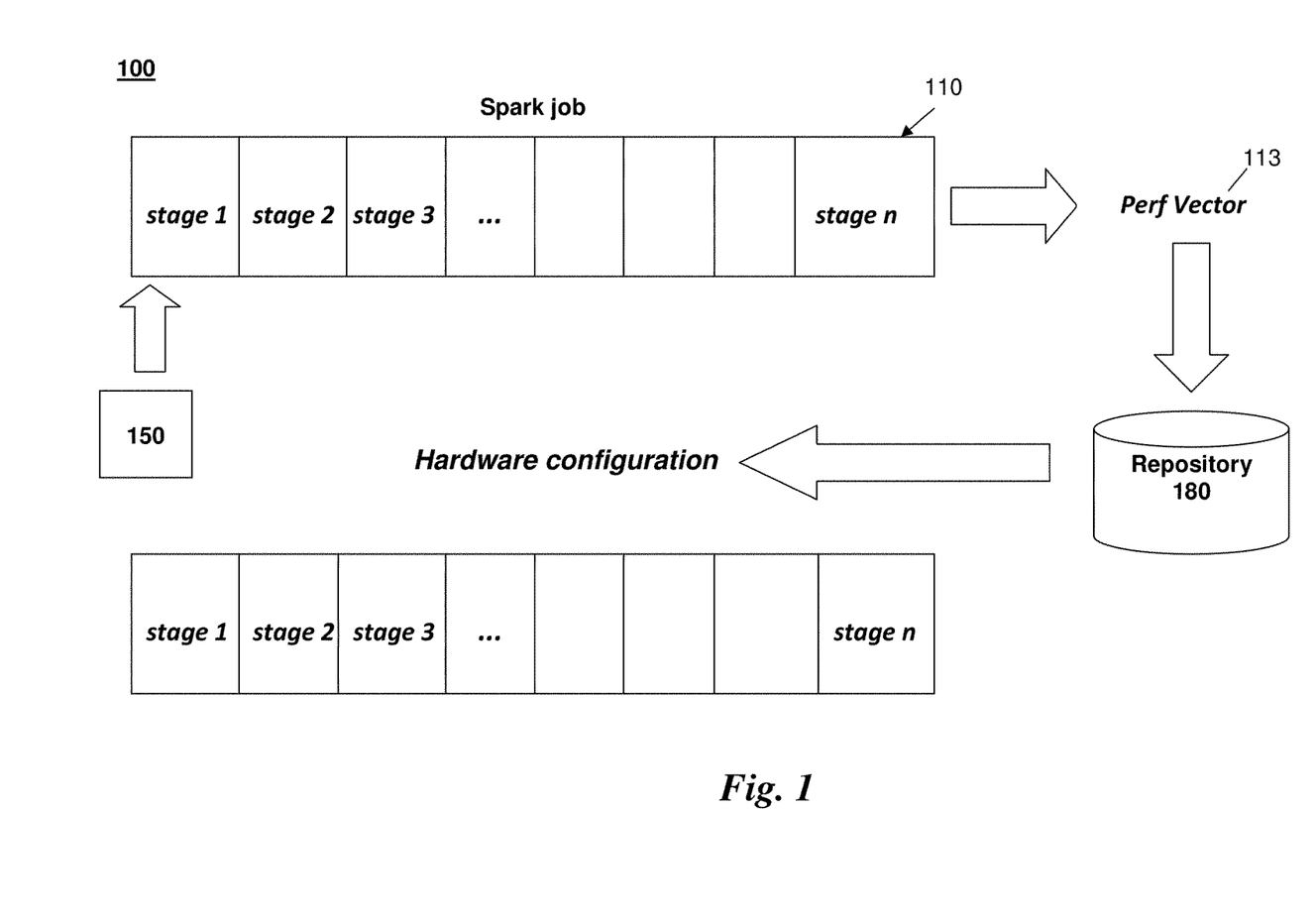
FIG. 1 is a simplified block diagram of a method for tuning hardware settings to optimize Spark applications.

FIG. 1—Machine Learning Method for Hardware Configurations

A known method for optimizing the hardware settings to adjust software applications such as Spark is exhausted searching. For example, the SMT mode can be set to SMT mode (1 thread per core), SMT2 mode (2 threads per core), or SMT4 mode (4 threads per core) when running benchmark jobs with differing system states. The SMT setting associated with the best benchmark job is recorded. When a new job arrives it is mapped to the most similar benchmark (system state). It is now a simple process of selecting the SMT mode recorded as the "best" for that benchmark. Another method, the static configuration method, runs a Spark job multiple times, with the SMT set to a different setting each time. For example, assume a job runs three times, with the SMT set to 1, 4, and 8 threads per core. After all three runs of the same job, the data is analyzed to determine which SMT configuration yielded the best results, then that configuration is selected for future jobs. Another method uses aspects of machine learning.

Referring now to FIG. 1 there is shown an example of the state of the art for optimizing hardware settings such as SMT and Prefetch for Spark applications. In this example, perf, a powerful performance analyzing tool 150 from Linux, is used. Machine learning is used to find optimal hardware configurations. Spark jobs 110 run in stages; therefore the performance analyzing tool 150 is set to run through the various stages of a Spark job 110 until the end. Once the Spark job 110 is complete, the perf vector 113 is obtained. The perf vector 113 details the runtime performance monitoring statistics for the Spark job 110, listing such events as runtime, cache miss, pipeline stalls, and the like. The perf vector 113 (also known as the PMU vector) is a vector whose elements are the values of a hardware performance event (as reported by perf). For example, assume the hardware performance event LD_MISS_L1, ST_MISS_L1 is selected for analysis. In that case, the perf vector 113 of [100, 101] reports that the L1 data cache miss caused by Load is 100 and the L1 data cache miss caused by Store is 101. The perf vector 113 is stored in a repository 180 in association with its respective hardware configuration. When the next Spark job 110 is ready, it retrieves a similar perf vector 113 reporting similar numbers for LD_MISS_L1 and ST_MISS_L1 and uses the associated hardware configuration to guide its hardware settings. As an example, a similar perf vector 113 in this example refers to a near distance between two perf vectors 113. Using Euclidian distance, we calculate the distance as $SQRT((x1^2-x2^2)+(y1^2-y2^2))$. The near distance method is one of the machine learning algorithms that can be used to establish a relationship between the hardware configuration and the fastest processing time. Other algorithms such as SVM, logistic regression, and decision trees can also be used to guide the hardware settings.

SUMMARY

Briefly, according to one embodiment of the invention, a computer-implemented method uses a predictive time-sequence model to adapt hardware configurations at run-time for an application including multiple stages of execution. At each stage a system monitor is started at the launch of a first task in a first run to collect performance data on hardware and software events using a performance monitoring tool. The system monitor is stopped at the completion of a last task in the first run. A performance vector of hardware and software events is obtained from the system monitor; then a predictive optimal configuration is computed and applied to the remaining runs in the stage. The predictive optimal configuration is computed using prediction models as a function of the run-time configuration and the performance vector. The predictive optimal configuration is applied to dynamically adjust the run-time configuration for the remaining runs in the stage. The parameters for the predictive optimal configuration are stored in a repository.

Briefly, according to another embodiment of the present invention, an information processing system for improving application performance uses a predictive time-sequence model to adapt hardware configurations at run-time for an application including multiple stages of execution. At each stage a system monitor is started at the launch of a first task in a first run to collect performance data on hardware and software events using a performance monitoring tool. The system monitor is stopped at the completion of a last task in the first run. A performance vector of hardware and software events is obtained from the system monitor, then a predictive optimal configuration is computed and applied to the remaining runs in the stage. The predictive optimal configuration is computed using prediction models as a function of the run-time configuration and the performance vector. The predictive optimal configuration is applied to dynamically adjust the run-time configuration for the remaining runs in the stage. The parameters for the predictive optimal configuration are stored in a repository.

According to another embodiment of the present invention, a computer program product includes a non-transitory computer readable storage medium using a predictive time-sequence model to adapt hardware configurations at run-time for an application including multiple stages of execution. At each stage a system monitor is started at the launch of a first task in a first run to collect performance data. The system monitor is stopped at the completion of a last task in the first run. A performance vector of hardware and software events is obtained from the system monitor, then a predictive optimal configuration is computed and applied to the remaining runs in the stage. The predictive optimal configuration is computed using prediction models as a function of the run-time configuration and the performance vector. The predictive optimal configuration is applied to dynamically adjust the run-time configuration for the remaining runs in the stage. The parameters for the predictive optimal configuration are stored in a repository.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Non-Limiting Definitions

The terms "a", "an" and "the" are intended to include the plural forms as well, unless the context clearly indicates otherwise.

The term "benchmark" means a standard against which to compare system performance. For example, we use training runs to collect benchmarks for different combinations of system states and performance metrics.

The term "BR_MPRED_CMPL" refers to a hardware event; in particular it means that a number of branch mis-predicts.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "computer cluster" means a set of loosely or tightly connected computers that work together.

The term cluster computing refers to linking computers into a network to harness the parallel processing power of the linked computers.

The term "core affinity," also known as "CPU pinning," enables binding and unbinding processes or threads to core, meaning that a process will execute only on its bound core.

The term "driver" refers to the process where the main method runs. First it converts the user program into tasks and after that it schedules the tasks on the executors.

The term "executors" means worker nodes that run individual tasks in Spark jobs. Executor processes are launched at the start of a Spark application. Once they have run the task they send the results to the driver.

The term "LD_MISS_L1" refers to a hardware event; in particular it means that a load instruction missed L1 cache.

The term "perf" refers to an open source tool from Linux. It is a command line utility for analyzing system performance. The term "PMU" stands for performance monitoring unit.

The term "perf vector" means a vector whose elements are the values of a hardware performance event, as reported by the perf tool. The perf vector details the runtime performance monitoring statistics for the job, listing such events as runtime, cache miss, pipeline stalls, and the like.

The term "PMU vector" is the same as the perf vector.

The term "prefetch" means transferring data from main memory to temporary storage in anticipation that the data will be needed.

The term "resilient distributed dataset" or "RDD" means a data structure that is distributed over a cluster of machines in a fault-tolerant manner.

The term "simultaneous multithreading" is a hardware technique for improving the overall efficiency of superscalar CPUs with hardware multithreading.

The term "Spark" is a proprietary term for a large-scale data analytics framework that facilitates the development and acceleration of big data analytics applications.

The term "stages" in a Spark system refers to a set of parallel tasks for one partition of the RDD.

The term "ST_MISS_L1" refers to a hardware event; in particular it means that a store instruction missed L1 cache.

The term "Support Vector Machine" refers to a classifier used in machine learning.

Figure 2:
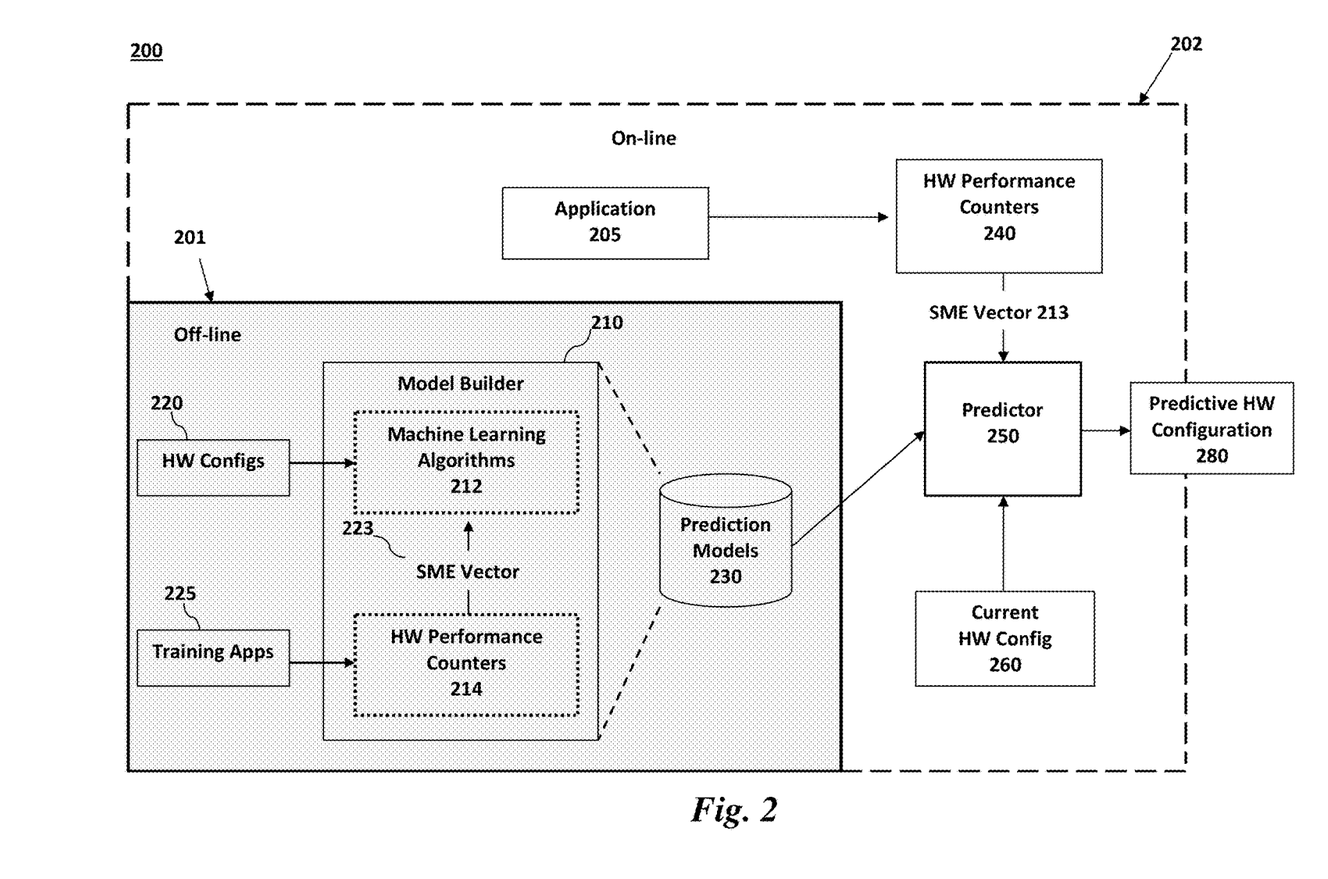
FIG. 2 is a simplified diagram of a two-phase method for dynamically adjusting hardware settings to optimize Spark applications, according to an embodiment of the present invention.

FIG. 2—Process Overview

We discuss a method to optimize hardware/software configurations to improve the performance of data analytics applications such as Spark applications by using time-sequence machine learning algorithms as well as profiling data from the Spark software stack. With the knowledge that even fine-grained architectural tuning can affect performance, we leverage the Spark stage concept to dynamically adjust hardware settings at run-time, for each stage of a Spark job 110. Our goal is to predict the optimal (or near optimal) SMT configuration for each stage of a running application to achieve better performance throughout. We assume that the system current state will affect the System Monitor Event Vector (SME Vector) 213; therefore we propose a time-sequence model based on a limited state machine to replace traditional state-less profiling. For purposes of this discussion, the state is the current SMT and Prefetch configuration on which a prediction model is based.

Spark launches executor Java Virtual Machines (JVMs) with multiple task (worker) threads. It is up to the Spark scheduler to schedule (bind) the worker threads to multiple cores. However, worker threads are often scheduled to distant cores and this affects system performance.

This method addresses the following technical challenges:
1. How to obtain the SME Vector 213 in a running Spark job 110?
2. How to use the SME Vector 213 to set an optimal/suboptimal configuration before the Spark job 110 completes?

Referring now to the block diagram of FIG. 2, we implement a two-phase process 200 to dynamically adjust hardware settings for running applications 205. The system current state 260 can affect the SME Vector 213, so we follow a time-sequence model based on a limited state machine to replace traditional state-less profiling.

The off-line process 201 is the machine learning phase where we train Prediction Models 230 to use during the on-line process 202. Our Model Builder 210 uses a Machine Learning Algorithm 212 and statistics from Hardware Performance Counters (HPCs) 214. The HPCs 214 are hardware-dependent counters that track a processor's performance, collecting data on hardware performance events such as cache hits, cache misses, instruction cycles, branch mis-predictions, and others. The performance statistics are stored in the Performance Monitoring Units (PMUs). PMUs are special purpose registers built into a processor to profile its hardware activity. Using a performance analyzing tool 150 such as perf, we interpret the counter statistics from the HPCs 214 to derive the SME vector 223 to use in the Machine Learning Algorithms 212.

The inputs into the Model Builder 210 are the Training Applications 225 and the Hardware Configurations 220, such as the SMT configuration specifying the number of threads per core. The SMT configuration for a specific processor can be set with a single command We set the Hardware Configurations 220 in the off-line process 201 and run the Training Applications 225 against them to feed a Prediction Model 270.

The Training Applications 225 highlight some of the performance issues that may arise during the on-line process 202. From the Training Applications 225 we designate benchmarks to use in the Prediction Model 270. We use the term "benchmark" in its generally understood meaning, i.e., as a standard against which to compare. In this discussion we use benchmarks as standards for system performance. During the training runs we collect benchmarks for different combinations of system states and performance metrics.

We run multiple Training Applications 225 and record the statistics from the HPCs 214 to derive the SME vectors 223 for the Training Applications 225. The Machine Learning Algorithm 212 calculates a benchmark for each Training Application 205 as follows using this formula:

$$y_n = f(x_n, s_{n-1})$$

where:
y is the Benchmark ID:
x is the SME vector 213 from perf;
s is the state of the Hardware Configuration 220 (SMT and Prefetch);
$s_{n-1}$ is the configuration state of the Training Application 225; and $f$ is the function of mapping the SME vector 213 to a training benchmark application.

In the online process 202, we solve for "g" in the following formula:

$$s_n = g(y_n) \text{ where:}$$

g is the function of mapping the benchmark model to the optimal configuration.

Figure 3:
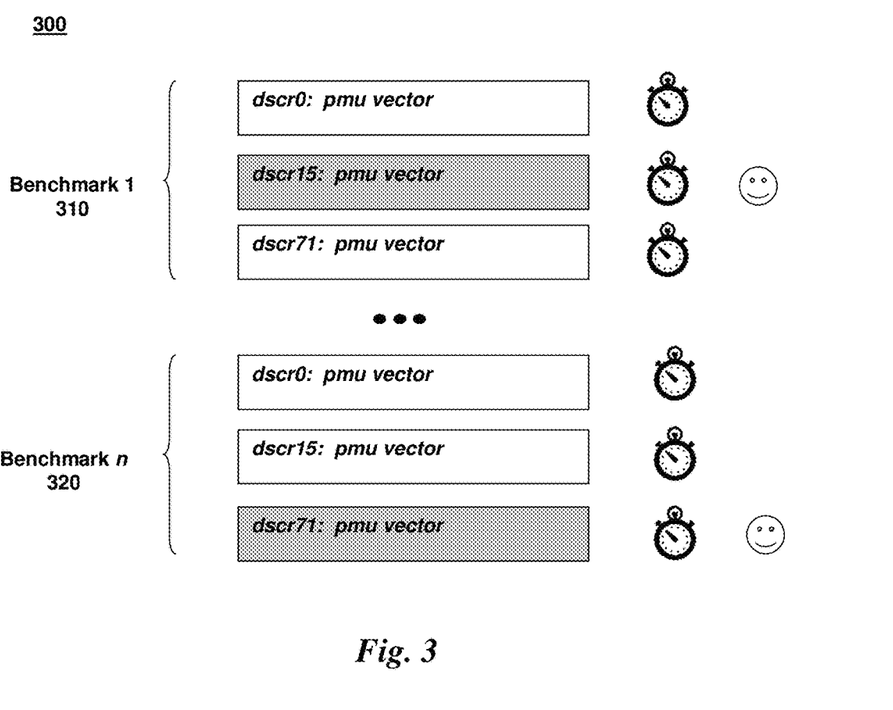
FIG. 3 shows benchmark data stored in a prediction model, according to an embodiment of the present invention.

FIG. 3—Benchmarks

FIG. 3 shows an example of benchmarks 300 calculated for a sampling of Training Applications 225. The benchmarks 300 can be stored in a Prediction Models Repository 230. In this example, we experiment with three different hardware configurations, labeled as dscr:0, dscr:15, and dscr:71. We calculate the SME vector 213 for the same Spark job 110 set to these three different hardware configurations. For the first Spark job 110, we determine that the configuration for dscr15 yielded the best results; therefore it is the optimal configuration for that Spark job 110. This becomes Benchmark 1 310. We repeat this for each of Training Applications 225, thus populating the Prediction Models Repository 230 with benchmarks Benchmark 1 through Benchmark n 320. The Prediction Models Repository 230 can also be extended dynamically by adding a new Spark job 110 with a precise run time.

Figure 4:
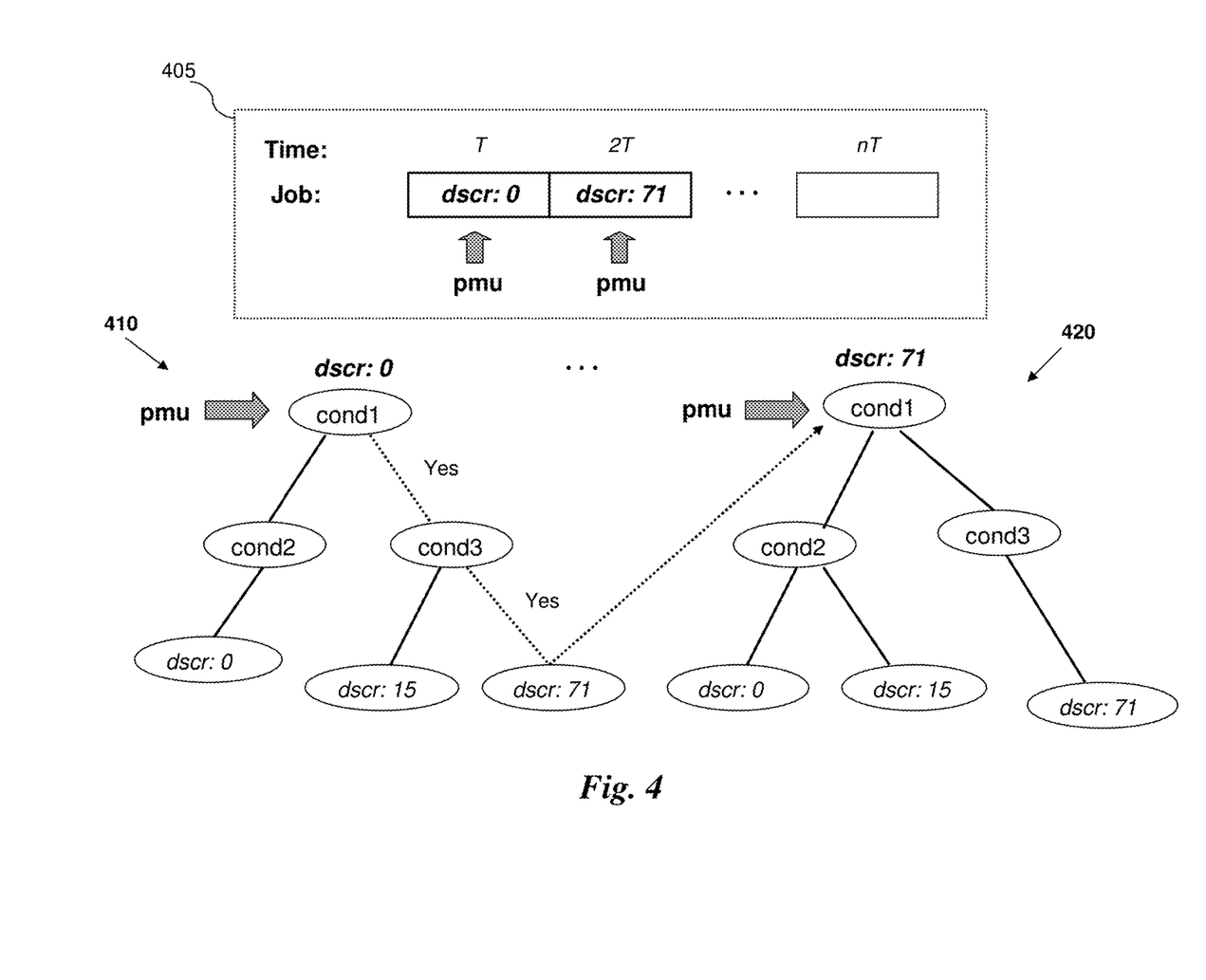
FIG. 4 shows a machine learning model as part of the machine learning method for building a prediction model, according to an embodiment of the present invention.

FIG. 4—Machine Learning Models

FIG. 4 shows aspects of building a prediction model using machine learning, including a decision tree. The example of FIG. 4 is simplified to show only the three hardware system states of FIG. 3: dscr: 0, dscr: 15, and dscr: 71. Stage 1 of the Spark job 110 begins at time T. Spark jobs 110 are run in stages. In temporal view 405 the system hardware state is initially set to dscr: 0, then the system hardware state is updated to dscr: 71 at time 2T. The decision trees 410 and 420 provide some insight on how the system hardware state is updated. Nodes "cond1," "cond2," and "cond3" represent possible hardware events catalogued by the performance monitoring tool. Some conditions can be, for example, LD_MISS_L1<500, ST_MISS_L1>10, or BR_MPRED_CMPL>10, among others. Beginning with tree 410, if the SME vector 213 satisfies "cond1," then the tree 410 is traversed along the dotted line to "cond3." And if the SME vector 213 also satisfies "cond3," then we can conclude that the configuration should be changed to dscr: 71. Therefore, as tree 420 reflects, the system hardware state at time 2T is set to dscr: 71.

Figure 5:
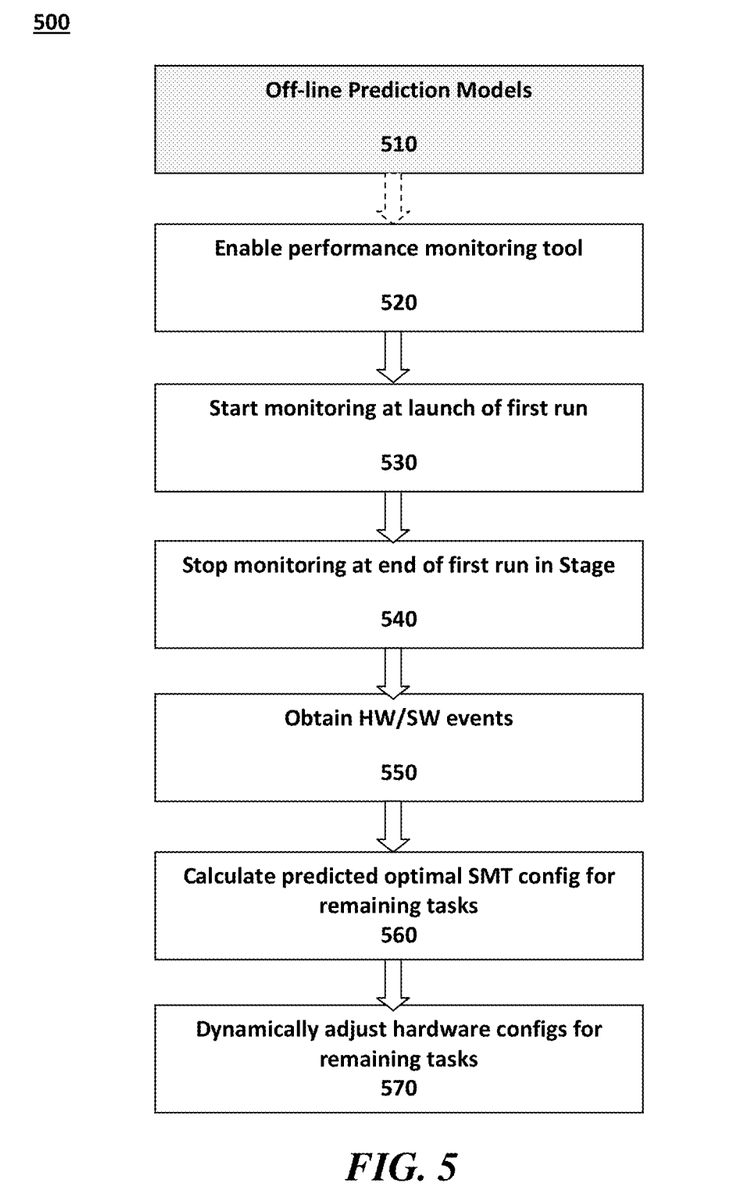
FIG. 5 is an operational flow diagram of the two-phase method for dynamically adjusting hardware settings to optimize Spark applications, according to an embodiment of the present invention.

FIG. 5—Operational Flow Diagram for Predictive Time Sequence Model

FIG. 5 shows an operational flow diagram 500 of the two-phase process for dynamic adaptive hardware configurations for optimizing software. As an example, we apply the focus to data analytics applications, such as Spark applications which include multiple stages of execution. Each stage has a plurality of runs (rounds) of parallel tasks run by executor nodes. In Spark jobs 110, the number of tasks in one stage is equal to the number of partitions. Stages have a clear start and end point, with a new stage starting every time the Spark job 110 needs to communicate between partitions. This is known as a "shuffle." At each start, we occupy one hardware thread. When the number of partitions in one stage is greater than the number of available hardware threads, there will be several rounds of tasks in the stage.

As previously stated, this is a two-phase process. In step 510, the off-line process 201 generates the Prediction Models 270 which will be used in the on-line process 202. The on-line process 202 commences at step 520 by triggering a performance analyzing tool 150, such as perf. In one embodiment, the triggering is controlled by hooks or software patches inserted into the Spark software stack and then the Application 205 is run on the Spark software stack.

We use first run results to predict the configurations for the other runs in the stage, with the assumption that the current Hardware Configuration 260 will affect the next task configuration. The following steps are performed for each stage in the Application 205. In step 530 the Spark job 110 begins, commencing with the first task. When the task is launched, the performance analyzing tool 150 is triggered and begins monitoring the system at the micro architecture level, recording performance data for hardware and software events. When the last task in the first round is completed, monitoring is stopped at step 540.

Using the recorded hardware/software events from step 530, in step 550 we obtain the performance vector (SME vector 213) of hardware and software events from the Hardware Performance Counters 240. Using the Prediction Models 270 from the off-line process 201, along with the Current Hardware Configuration 260, we compute a Predictive Optimal Hardware Configuration 280 for the remaining runs in the stage as a function of the run-time configuration 260 and the SME vector 213 in step 560.

We view this computation from the point of view of a classification problem. Various machine learning algorithms can be used to solve the problem. One such method is the near distance method wherein the SME vector 213 for the current Spark job 110 is matched against a benchmark 300. The hardware configuration associated with that benchmark 300 (or closest to it) is designated as the Predictive Optimal Hardware Configuration 280 for the remaining runs in the current stage. Additionally, we can find a solution using a decision tree such as the trees 410 and 420 shown in FIG. 4, Support Vector Machine (SVM), logistic regression, and other algorithms.

In step 570 we dynamically adjust the hardware configuration for the remaining tasks in the current stage of the running Application 205 by applying the Predictive Optimal Hardware Configuration 280 to subsequent tasks in the current stage. The adjustments are dynamically implemented at the Spark software stack by the insertion of hook functions and are transparent to user applications. In one example, the goal is to free cores. With this goal in mind, the adjustment can include binding executor nodes to processor cores in order to reduce any pipeline conflicts of core, thus obtaining higher performance.

Figure 6:
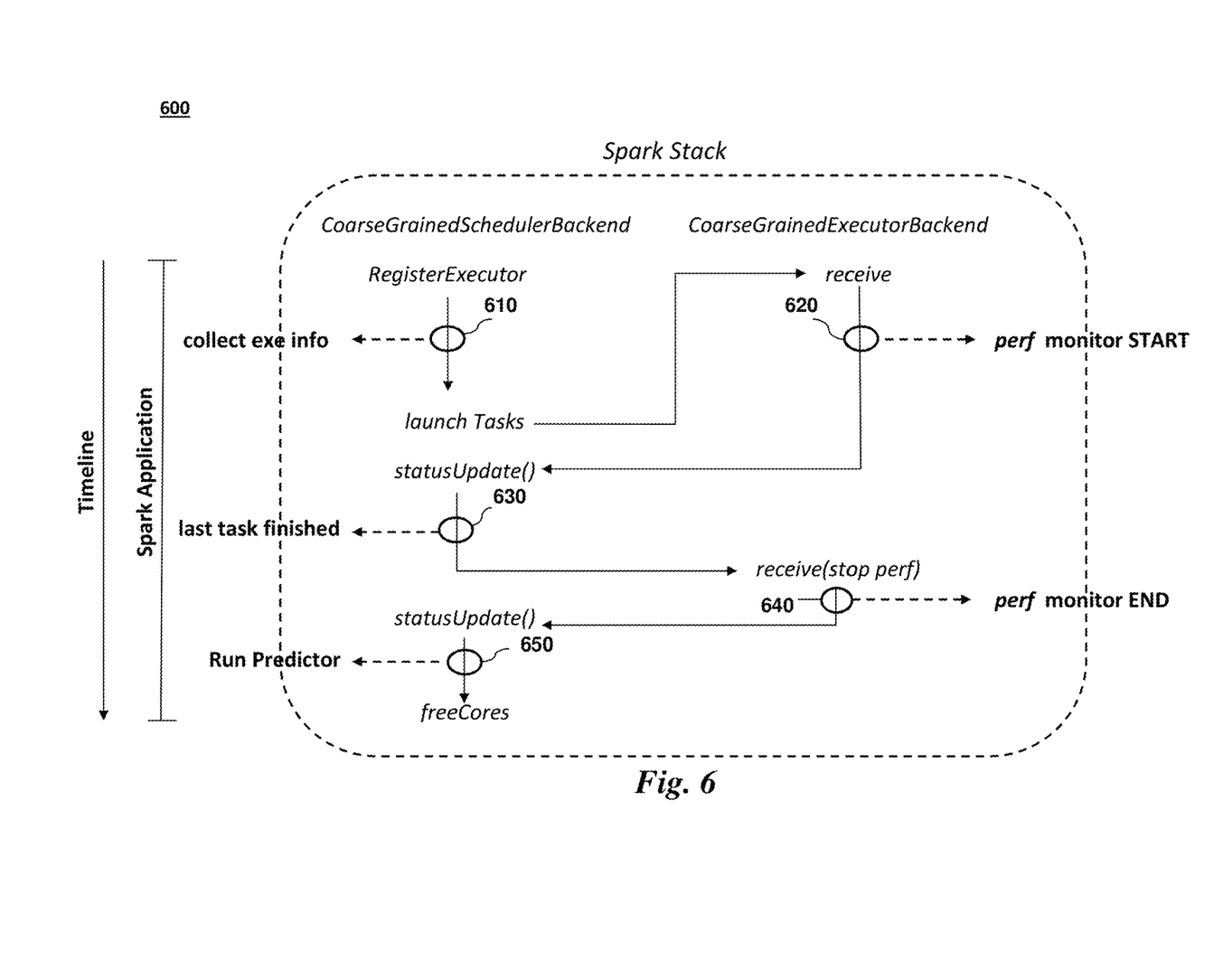
FIG. 6 shows the points at which code is inserted in the Spark Stack, according to an embodiment of the present invention.
Figure 7:
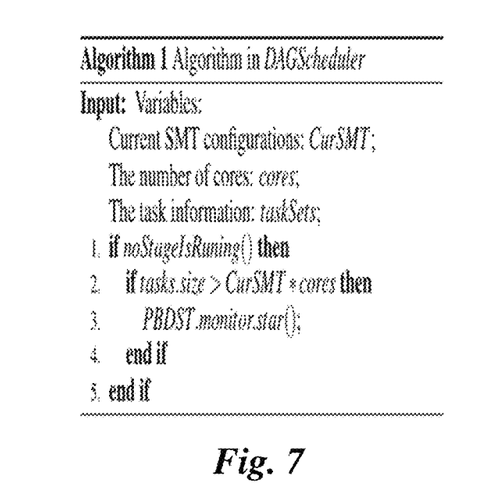
FIG. 7 shows an example of the code from the Spark Stack of FIG. 6, specifically the code for starting the monitor, according to an embodiment of the present invention.
Figure 8:
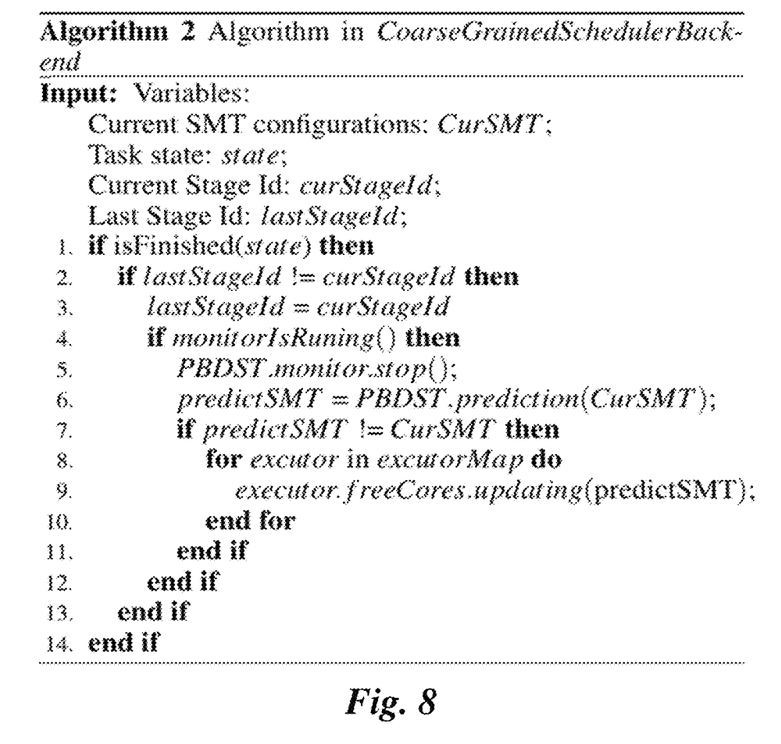
FIG. 8 shows an example of the code from the Spark Stack of FIG. 6, specifically the code for updating the hardware configuration, according to an embodiment of the present invention.

FIGS. 6, 7 and 8—Spark Stack

Referring now to FIG. 6, there is shown a simplified schematic of the implementation of the time-sequence prediction model on a Spark stack 600. In Spark, the scheduler assigns tasks to executor nodes. One executor node runs a subset of all the tasks. We start monitoring at the beginning of a first task and end monitoring at the end of a last task. The scheduler backend in the driver knows which executor node is currently running a task, so that it can send a message to the correct executor node to start and/or stop the monitoring.

We insert code at multiple points in a background layer of the Spark stack 600, at both the scheduler and executor layers. In one example, we insert code at three points at the scheduler layer. At 610 we collect the identity of the executor nodes to which the tasks are assigned. At status update points 630 and 650 we insert hooks/code to advise when the last task in the first run is finished and when the performance monitor ends. At that point the Predictor 250 computes the optimal hardware configuration that will free cores. Because we are able to act at the beginning of the stage, we can maintain a fast executor node and shut down a slow executor node.

The performance analyzing tool 150 is launched by the executor that is registered to run the current task. At the executor identified in 610, we insert a hook 620 to start the performance analyzing tool 150 at the launch of the first task in the first round of each stage. When the last task in the first round is complete, another hook 640 ends the monitoring. The timeline addresses the problem of how to monitor the system metrics and responsively adapt in a timely manner, well before a job completes. FIG. 7 shows an example of the code for the algorithm run by a scheduler node (the DAG-Scheduler) to start the performance analyzing tool 150, and FIG. 8 shows an example of code for the algorithm to update the hardware configuration.

Figure 9:
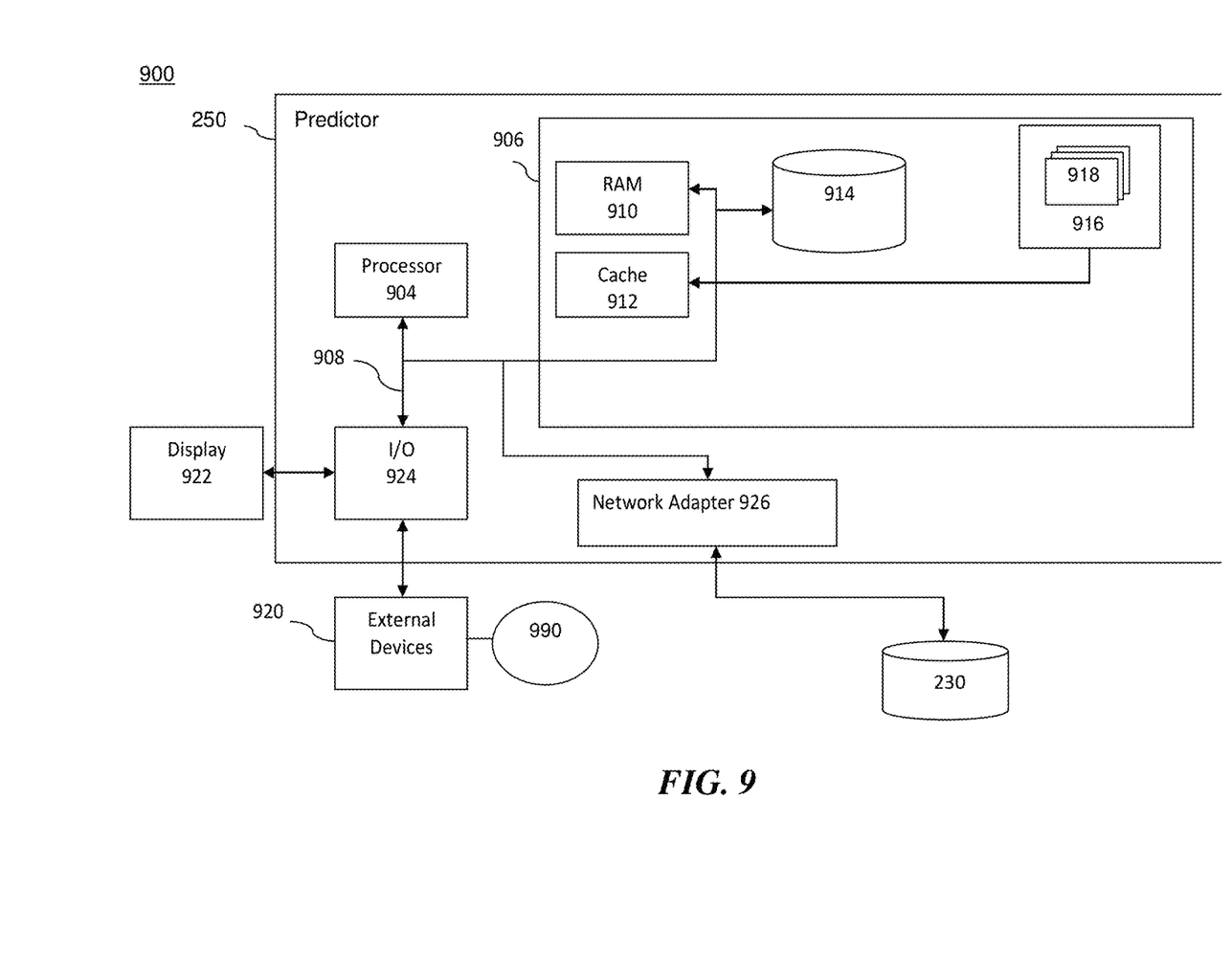
FIG. 9 is a simplified block diagram illustrating an information processing system, according to an embodiment of the present invention.

Hardware Embodiment—FIG. 9

FIG. 9 illustrates one example of the components of an information processing system 900 for adaptive hardware configurations that can be utilized in various embodiments of the present disclosure. The information processing system 900 shown in FIG. 9 is only one example of a suitable system and is not intended to limit the scope of use or functionality of embodiments of the present disclosure described above. The information processing system 900 of FIG. 9 is capable of implementing and/or performing any of the functionality set forth above. Any suitably configured processing system can be used as the information processing system 900 in embodiments of the present disclosure.

The information processing system 900 is operational with numerous other general purpose or special purpose computing system environments or configurations. Examples of well-known computing systems, environments, and/or configurations that may be suitable for use with the information processing system 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The information processing system 900 may be described in the general context of computer-executable instructions, being executed by a computer system. The information processing system 900 may be practiced in various computing environments such as conventional and distributed cloud computing environments where tasks are performed by remote processing devices that are linked through a communications network. In a distributed cloud computing environment, program modules may be located in both local and remote computer system storage media including memory storage devices.

As illustrated in FIG. 9, the information processing system 900 includes the predictor 250 in the form of a general-purpose computing device. The components of the predictor 250 can include, but are not limited to, one or more processor devices or processing units 904, a system memory 906, and a bus 908 that couples various system components including the system memory 906 to the processor 904.

The bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 906 can also include computer system readable media in the form of volatile memory, such as random access memory (RAM) 910 and/or cache memory 912. The predictor 250 can further include other removable/non-removable, volatile/non-volatile computer system storage media. By way of example only, a storage system 914 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 908 by one or more data media interfaces. The memory 906 can include at least one program product having a set of program modules that are configured to carry out the functions of an embodiment of the present invention.

Program/utility 916, having a set of program modules 918, may be stored in memory 906 by way of example, and not limitation, as well as an operating system, one or more application programs, other program modules, and program data. Generally, program modules may include routines, programs, objects, components, logic, data structures, and so on that perform particular tasks or implement particular abstract data types. Each of the operating system, one or more application programs, other program modules, and program data or some combination thereof, may include an implementation of a networking environment. Program modules 918 generally carry out the functions and/or methodologies of embodiments of the present invention.

The predictor 250 can also communicate with one or more external devices 920 such as a keyboard, a pointing device, a display 922, etc.; one or more devices that enable a user to interact with the predictor 250; and/or any devices (e.g., network card, modem, etc.) that enable the predictor 250 to communicate with one or more other computing devices. Such communication can occur via I/O interfaces 924. Still yet, the predictor 250 can communicate with one or more networks such as a local area network (LAN), a general wide area network (WAN), and/or a public network (e.g., the Internet) via network adapter 926, enabling the system 900 to access a knowledge repository such as the Prediction Models 230. As depicted, the network adapter 926 communicates with the other components of the predictor 250 via the bus 908. Other hardware and/or software components can also be used in conjunction with the predictor 250. Examples include, but are not limited to: microcode, device drivers, redundant processing units, external disk drive arrays, RAID systems, tape drives, and data archival storage systems.

Computer Program Product Support

As will be appreciated by one skilled in the art, aspects of the present disclosure may be embodied as a system, method, or computer program product 990 at any possible technical detail level of integration. The computer program product 990 may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, although not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, although not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer readable storage medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, although do not preclude the presence or addition of one or more other features, integers, steps, operations, elements, components, and/or groups thereof.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the disclosure. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for improving performance of applications by adapting a hardware configuration at run-time, the computer-implemented method comprising:
   receiving as input to a predictive time-sequence model, a run-time configuration for an application comprising multiple stages of execution, each stage comprising a plurality of runs of parallel tasks run by executor nodes;
   inserting a first hook function at a scheduler node of a software stack on which the application is run to identify an executor node registered to run a first task in a first run;
   once the executor node registered to run the first task is identified, inserting a second hook function for starting a system monitor in a background layer of the executor node; and
   as executor nodes for remaining tasks are identified, inserting a third hook function for stopping the system monitor, the third hook function inserted at a last task in the first run; and
   for each stage:
      starting the system monitor at launch of the first task in the first run, wherein the system monitor collects performance data on hardware and software events using a performance monitoring tool;
      stopping the system monitor upon completion of the last task in the first run;
      obtaining a performance vector of hardware and software events from the system monitor;
      using prediction models, computing a predictive optimal configuration for remaining runs in the stage as a function of the run-time configuration and the performance vector;
      applying the predictive optimal configuration to dynamically adjust the run-time configuration for the remaining runs in the stage; and
      storing parameters for the predictive optimal configuration in a repository.

2. The computer-implemented method of claim 1 wherein receiving the run-time configuration comprises receiving hardware metrics for simultaneous multi-threading and hardware prefetch within a cluster computing framework.

3. The computer-implemented method of claim 1 further comprising:
   using training applications previously run on a sampling of hardware configurations, building the prediction models with machine learning algorithms and statistics from hardware performance counters.

4. The computer-implemented method of claim 3 wherein building the prediction models comprises:
   applying performance vectors to the training applications with a plurality of hardware configurations to determine the hardware configuration that yields a fastest processing time; and
   using a machine learning algorithm, establishing the hardware configuration that yields a fastest processing time as a benchmark.

5. The computer-implemented method of claim 1 wherein applying the predictive optimal configuration to dynamically adjust the run-time configuration comprises binding an executor node to a processor core.

6. The computer-implemented method of claim 5 further comprising maintaining high-performing executor nodes while shutting down lower-performing executor nodes.

7. The computer-implemented method of claim 1 wherein the predictive time-sequence model is based on a limited state machine.

8. An information processing system for improving performance of applications by adapting a hardware configuration, comprising:
   a processor device; and
   a memory operably coupled with the processor device and storing computer-executable instructions causing a computer to perform:
      receiving as input to a predictive time-sequence model, a run-time configuration for an application comprising multiple stages of execution, each stage comprising a plurality of runs of parallel tasks run by executor nodes;
      inserting a first hook function at a scheduler node of a software stack on which the application is run to identify an executor node registered to run a first task in a first run;
      once the executor node registered to run the first task is identified, inserting a second hook function for starting a system monitor in a background layer of the executor node; and
      as executor nodes for remaining tasks are identified, inserting a third hook function for stopping the system monitor, the third hook function inserted at a last task in the first run; and
      for each stage:
         starting the system monitor at launch of the first task in the first run, wherein the system monitor collects performance data on hardware and software events using a performance monitoring tool;
         stopping the system monitor upon completion of the last task in the first run;
         obtaining a performance vector of hardware and software events from the system monitor;
         using prediction models, computing a predictive optimal configuration for remaining runs in the stage as a function of the run-time configuration and the performance vector;
         applying the predictive optimal configuration to dynamically adjust the run-time configuration for the remaining runs in the stage; and
         storing parameters for the predictive optimal configuration in a repository.

9. The information processing system of claim 8 wherein the run-time configuration comprises hardware metrics for simultaneous multi-threading and hardware prefetch within a cluster computing framework.

10. The information processing system of claim 8 wherein the prediction models are built with machine learning algorithms and statistics from hardware performance counters using training applications previously run on a sampling of hardware configurations.

11. The information processing system of claim 10 further comprising:
   performance vectors applied to the training applications across a plurality of hardware configurations to determine the hardware configuration that yields a fastest processing time; and
   a machine learning algorithm used to establish the hardware configuration that yields the fastest processing time as a benchmark.

12. The information processing system of claim 8 wherein the computer-executable instructions further cause the computer to perform maintaining high-performing executor nodes while shutting down lower-performing executor nodes.

13. The information processing system of claim 8 wherein applying the predictive optimal configuration to dynamically adjust the run-time configuration comprises binding an executor node to a processor core.

14. The information processing system of claim 8 wherein the predictive time-sequence model is based on a limited state machine.

15. A computer program product for improving performance of applications by adapting a hardware configuration at run-time, the computer program product comprising:

a non-transitory computer readable storage medium readable by a processing device and storing instructions for execution by the processing device for performing a method comprising:

receiving as input to a predictive time-sequence model, a run-time configuration for an application comprising multiple stages of execution, each stage comprising a plurality of runs of parallel tasks run by executor nodes;

inserting a first hook function at a scheduler node of a software stack on which the application is run to identify an executor node registered to run a first task in a first run;

once the executor node registered to run the first task is identified, inserting a second hook function for starting a system monitor in a background layer of the executor node; and as executor nodes for remaining tasks are identified, inserting a third hook function for stopping the system monitor, the third hook function inserted at a last task in the first run; and for each stage:

starting the system monitor at launch of the first task in the first run, wherein the system monitor collects performance data on hardware and software events using a performance monitoring tool;

stopping the system monitor upon completion of the last task in the first run;

obtaining a performance vector of hardware and software events from the system monitor;

using prediction models, computing a predictive optimal configuration for remaining runs in the stage as a function of the run-time configuration and the performance vector;

applying the predictive optimal configuration to dynamically adjust the run-time configuration for the remaining runs in the stage; and storing parameters for the predictive optimal configuration in a repository.

\* \* \* \* \*